(12) United States Patent  
Silvera et al.

(10) Patent No.: US 8,527,962 B2  
(45) Date of Patent: Sep. 3, 2013

(54) PROMOTION OF A CHILD PROCEDURE IN HETEROGENEOUS ARCHITECTURE SOFTWARE

(75) Inventors: Raul Silvera, Woodbridge (CA); Ettore Tiotto, Markham (CA); Guansong Zhang, Markham (CA)

(73) Assignee: International Business Machines Corporation, Armonk, NY (US)

( * ) Notice: Subject to any disclaimer, the term of this patent is extended or adjusted under 35 U.S.C. 154(b) by 1212 days.

(21) Appl. No.: 12/400,840

(22) Filed: Mar. 10, 2009

(65) Prior Publication Data

US 2010/0235811 A1 Sep. 16, 2010

(51) Int. Cl.
*G06F 9/45* (2006.01)

(52) U.S. Cl.
USPC ........... 717/130; 717/141; 717/142; 717/143; 717/158

(58) Field of Classification Search
USPC ................................................. 717/100–164
See application file for complete search history.

(56) References Cited

U.S. PATENT DOCUMENTS

2005/0273769 A1 12/2005 Eichenberger et al.
2006/0123401 A1* 6/2006 O'Brien et al. ................ 717/131

OTHER PUBLICATIONS

CBE Programmers Guide IBM, [online]; [retrieved on Jan. 10, 2008]; retrieved from the Internet http://www-01.ibm.com/chips/techlib/techlib.nsf/techdocs/1DAAA0A3B64047630025735300066008C.

* cited by examiner

*Primary Examiner* — Chuck Kendall
(74) *Attorney, Agent, or Firm* — Cantor Colburn LLP; Libby Toub (57) ABSTRACT

A method for promotion of a child procedure in a software application for a heterogeneous architecture, wherein the heterogeneous architecture comprises a first architecture type and a second architecture type, comprises inserting a parameter representing a parallel frame pointer to a parent procedure of the child procedure into the child procedure; and modifying a reference in the child procedure to a stack variable of the parent procedure to include an indirect access to the parent procedure via the parallel frame pointer.

19 Claims, 6 Drawing Sheets

```
ALLOCATE AGGREGATE IN PARENT PROCEDURE
301
```

```
COLLECT PARENT STACK VARIABLES REFERENCED IN CHILD PROCEDURES INTO
AGGREGATE
302
```

```
TRAVERSE PARENT PROCEDURE CODE, REPLACING REFERENCES TO VARIABLES
COLLECTED IN AGGREGATE WITH REFERENCES TO THEIR CORRESPONDING MEMBER IN
AGGREGATE
303
```

```
PASS PARALLEL FRAME POINTER TO SMP RUNTIME ROUTINE USED TO INVOKE CHILD
PROCEDURES
304
```

```
SMP RUNTIME FUNCTION CALLS CHILD PROCEDURES, PASSES PARALLEL FRAME POINTER
TO CHILD PROCEDURES
305
```

PROMOTION OF A CHILD PROCEDURE IN HETEROGENEOUS ARCHITECTURE SOFTWARE

BACKGROUND

This disclosure relates generally to the field of heterogeneous computing architectures.

A heterogeneous computing architecture is a system that comprises multiple architecture types, which may include processors of multiple types. An example of a heterogeneous architecture is the Cell Broadband system marketed by IBM (see http://www-03.ibm.com/technology/cell/index.html for more information). Cell Broadband runs on a single chip multiprocessor containing a PowerPC Processor (PPU) that may run the operating system (OS) and applications, and a set of eight Synergistic Processing Units (SPUs) which are optimized for running computationally intensive applications. The SPU processors are lightweight specialized processors with limited hardware resources. SPUs do not have traditional caches, instead relying on a small (256 KB) directly addressable local store (LS) to manage memory transfer between the SPU chip and main memory of the multiprocessor.

A software application for a heterogeneous architecture may comprise software for the different processor types. The software for the different types of processors may require separate compilation. Software written for a heterogeneous architecture may be compiled by subdividing the heterogeneous software application into homogeneous portions for each processor type. A programmer may be responsible for separating the program portions for each type of processor; the separated program portions are then compiled separately, and the resulting object files are linked into the final executable program. Alternatively, an advanced compiler for a heterogeneous architecture may compile a heterogeneous program by automatically partitioning the program into portions for the different types of processors. For example, a programmer writing software for the Cell Broadband system may identify which program portions contain code to run on the SPUs, and the compiler may use the programmer's annotations to automatically partition the code into PPU and SPU compilation units. One method of annotating the program is to use directives to indicate which program portions are to be run in parallel on the SPUs, for example, OpenMP directives.

An SPU code region may be outlined into a separate procedure. The outlined procedure may be indirectly invoked from its original parent procedure by inserting a call to a runtime system into the parent procedure; the runtime system will then call the outlined procedure. The calling procedure may be referred to as a parent procedure, and the outlined procedure may be referred to as a child of the parent procedure. The outlined child procedure is nested within the scope of the parent procedure.

In a program compiled for an homogeneous architecture any variable allocated on the stack of a parent procedure may be referenced by an outlined nested child procedure. That is, in a homogeneous program, the outlined nested child procedure has implicit access to its parent procedure's stack frame. However, in a heterogeneous program, the outlined procedure needs to be executed on a different processor type than the processor type which executes the parent procedure; therefore, the outlined procedure needs to be separated from its parent procedure and compiled into a separate compilation unit, while maintaining access to the stack variables of its parent procedure.

BRIEF SUMMARY

An exemplary embodiment of method for promotion of a nested procedure in a software application for a heterogeneous architecture, wherein the heterogeneous architecture comprises a first architecture type and a second architecture type, comprises inserting a parameter representing a parallel frame pointer to a parent procedure of the child procedure into the child procedure; and modifying a reference in the child procedure to a stack variable of the parent procedure to include an indirect access to the parent procedure via the parallel frame pointer.

An exemplary embodiment of computer program product comprises a computer readable storage medium containing computer code that, when executed by a computer, implements a method for promotion of a nested procedure in a software application for a heterogeneous architecture, wherein the heterogeneous architecture comprises a first architecture type and a second architecture type, wherein the method comprises inserting a parameter representing a parallel frame pointer to a parent procedure of the child procedure into the child procedure; and modifying a reference in the child procedure to a stack variable of the parent procedure to include an indirect access to the parent procedure via the parallel frame pointer.

An exemplary embodiment of system for promotion of a nested procedure in a software application for a heterogeneous architecture comprises a first architecture type; a second architecture type; a compiler configured to compile the software application for the first architecture type and the second architecture type; and a promotion module, the promotion module configured to insert a parameter representing a parallel frame pointer to a parent procedure of the child procedure into the child procedure and modify a reference in the child procedure to a stack variable of the parent procedure to include an indirect access to the parent procedure via the parallel frame pointer.

Additional features are realized through the techniques of the present exemplary embodiment. Other embodiments are described in detail herein and are considered a part of what is claimed. For a better understanding of the features of the exemplary embodiment, refer to the description and to the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

Embodiments of systems and methods for promotion of a child, or nested, procedure in software for a heterogeneous architecture are provided, with exemplary embodiments being discussed below in detail.

Partitioning of software for a heterogeneous architecture may be enabled by providing explicit access to a parent procedure's stack frame (or a portion of the stack frame) through a parallel frame pointer that is passed, directly or indirectly, to the promoted child procure by its parent procedure. The process of separating a nested child procedure from its parent procedure may be referred to as nested procedure promotion. The separation of a parent procedure and a child procedure into different compilation units prevents the promoted child procedure from directly accessing the parent's stack frame. To allow access to the parent's stack frame by its promoted child procedures, a parent procedure may pass a pointer to its stack frame (or a portion of its stack frame) to its promoted child procedures. The pointer to the parent's stack frame may be referred to as a parallel frame pointer. Any reference to a parent variable in a promoted child procedure may be replaced with an indirect reference through the parallel frame pointer. The parallel frame pointer contains the address of the parent's stack (or a portion of the parent stack), allowing indirect access to the parent procedure's stack variables. The compiler may then separate parent and child procedures into portions that are compiled for different processor types.

Parent and child procedures may also be separated for parallel execution on different processors of the same type. For example, in the Cell Broadband architecture, the compiler separates the PPU program portion from the SPU program portion. The SPU program portion may then be further partitioned into separate smaller code sections, so as to fit the smaller code sections in a SPU local store, which is relatively small. Separation of the SPU program portion into independent procedures allows the compiler to make efficient use of the SPU overlay support provided by the Cell architecture. Code segments may be dynamically loaded, or overlaid, from main storage to the local store on the SPU at the time that execution of the particular code segment is required. The smallest unit of code that may be executed independently is a procedure, so the smallest overlay is at the procedure level. In the SPU code portion, there may be parent and child procedures. Provision of explicit access to parent procedure variables through a parallel frame pointer in the child procedure allows for separate compilation of the parent and child procedures, enabling the division of SPU code into smaller sections, taking better advantage of the code overlay mechanism. For a detailed description of SPU overlay support, see the IBM Software Development Kit for Multicore Acceleration Guide, version 3.0, at pages 75-91.

Figure 1:
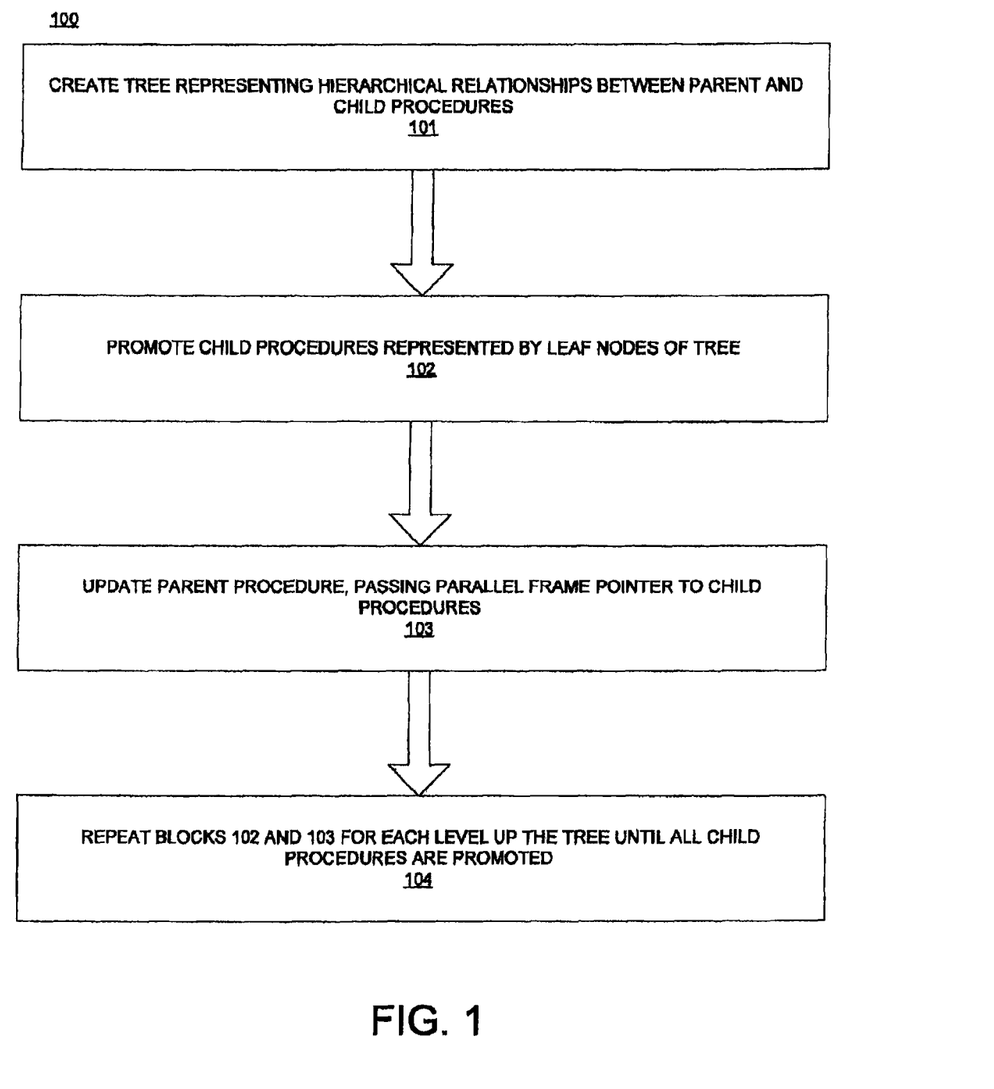
FIG. 1 illustrates an embodiment of a method for promotion of a child procedure in software for a heterogeneous architecture.

FIG. 1 illustrates an embodiment of a method for promotion of a child procedure in software for a heterogeneous architecture. FIG. 1 will be explained with reference to FIG. 4, which illustrates an embodiment of a software tree. In block 101, a map is created of the hierarchical relationships between parent and child procedures in the software application. The resulting map may resemble a tree structure, in which the nodes of the tree are the various procedures, and the edges represent the hierarchical parent-child relationships between procedures. An embodiment of a tree 400 that may be created in block 101 is shown in FIG. 4. The root node 401 of the tree 400 represents the outermost parent procedure, and leaves 404, 405, and 406 of the tree 400 represent the most deeply nested children. Intermediate nodes 402 and 403 are both child and parent procedures. In block 102, the leaf nodes 404-406 of the tree are each promoted using the method shown in FIG. 2. After promotion, each of the leaf nodes 404, 405, and 406 is at the same lexical level as nodes 402 and 403. In block 103, the parent procedure is updated using the method discussed below with reference to FIG. 3. In the example of FIG. 4, nodes 402 and 403 are updated in block 103. In block 104, blocks 102 and 103 are repeated for any nodes at the next level up in the tree. In the example of FIG. 4, nodes 402, 403, and 404-406 are promoted in the next iteration of block 104. Promotion of nodes 404-406 in block 104 accounts for variables referenced in nodes 404-406 that are owned by an ancestor procedures (for example, a parent of a parent procedure) of nodes 404-406; in the example of FIG. 4, root node 401 is an ancestor of nodes 404-406. The root node 401 of the tree 400 is updated after all its child procedures are promoted. Promotion and updating is repeated for any additional levels in the tree until the root node is reached and all child procedures in the tree are promoted.

Figure 2:
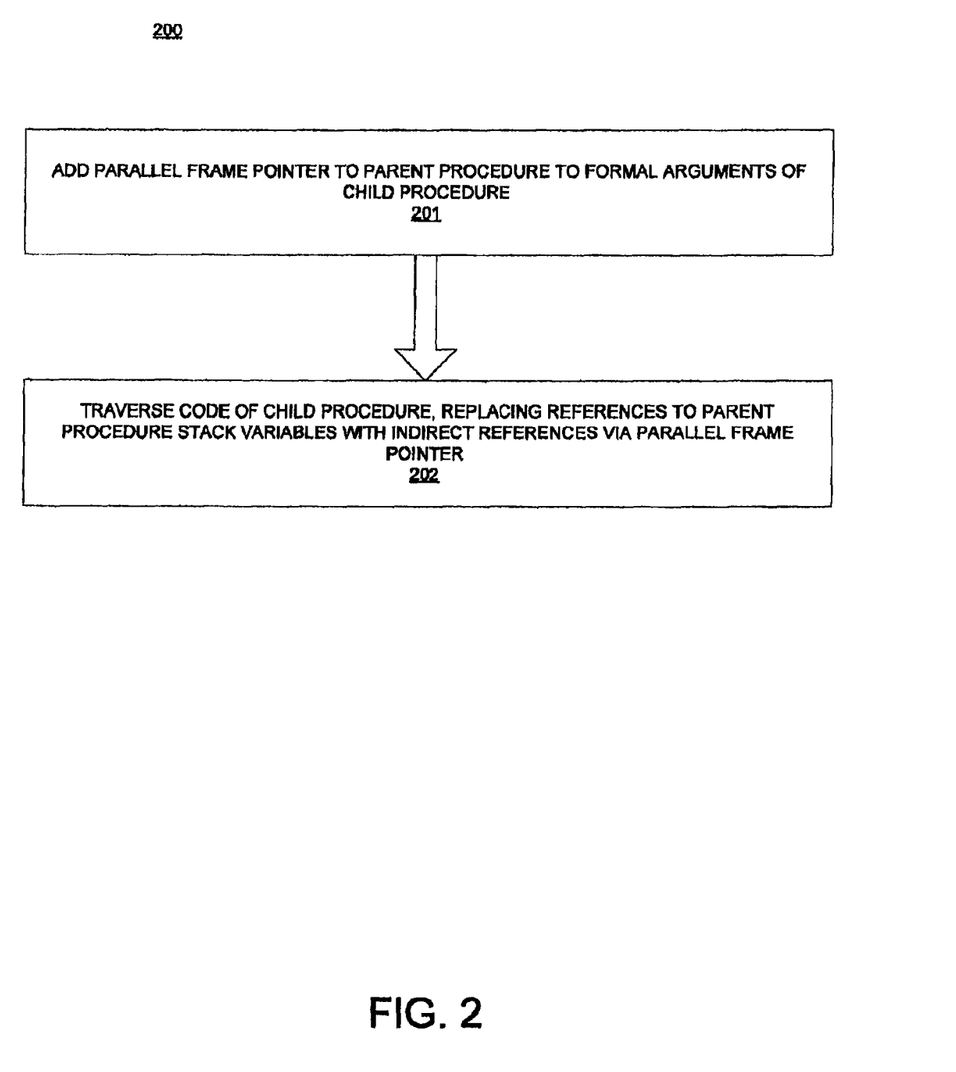
FIG. 2 illustrates an embodiment of a method for updating of a child procedure.

FIG. 2 illustrates an embodiment of a method for promotion of a child procedure. In block 201, a reference to a parallel frame pointer, which contains the address of an aggregate allocated in the parent procedure stack, is added to the formal arguments of the child procedure. In block 202, the computer code that comprises the child procedure is traversed in lexicographical order, and all references to a variable allocated on the parent procedure stack is remapped by rewriting the references in the child procedure as indirect references via the parallel frame pointer.

A child procedure may require access to the variables belonging to the child's ancestor procedures, i.e., a parent of a parent procedure, a parent of a parent of a parent procedure, etc. A child procedure must therefore have access to the frame pointers of any ancestor procedures. In one embodiment, a parallel frame pointer for each of the child's ancestor procedures may be added to the formal arguments of a child procedure. In an example referring to FIG. 4, tree 400 has root node 401, which has immediate child 402, and leaf node 404 is a child of 402. Root node 401 is an ancestor of node 404. Variable 1 (V1) denotes a variable owned by root node 401, and Variable 2 (V2) denotes a variable owned by node 402. Assuming node 404 references both variables V1 and V2, node 404 requires 2 parallel frame pointers, FP1 to node 401, and FP2 to node 402, to reference variables V1 and V2. Therefore if node 404 contains the statement:

$$V1=V2;$$

the statement is rewritten as:

$$FP1 \rightarrow V1 = FP2 \rightarrow V2;$$

where FP1 and FP2 are the parallel frame pointers of procedure to nodes 401 and 402, respectively.

In other embodiments, each parent procedure may have a single parallel frame pointer that is accessible to its child procedures. In such embodiments, each child node in the tree may only access the parallel frame pointer of its immediate parent. A parent node may place another parallel frame pointer to the parent's parent procedure (ancestor procedure of the child procedure) inside the aggregate that is allocated on the parent's stack, making the parallel frame pointer to the ancestor procedure accessible to the parent's child procedures. In such an embodiment, a child procedure is able to access variables from an ancestor procedure via the parallel frame pointer it receives from its immediate parent procedure. In an example, procedure 402 receives frame pointer FP1 to procedure 401, and adds it as a member of the aggregate UNP1 that groups the stack variables referenced by its child procedures. Procedure 404 receives the parallel frame pointer FP2, which points to UNP1. FP1 may be accessed in node 404 via FP2. The reference V1=V2 in procedure 404 is then rewritten as:

$FP2 \rightarrow FP1 \rightarrow V1 = FP2 \rightarrow V2;$

In order for node 404 to access V1, it is necessary to reference the parallel frame pointer FP2 to node 402, which gives access to the parallel frame pointer FP1 inside aggregate UNP1 of node 401. Parallel frame pointer FP1 may then give access to the variables of node 401.

Figure 3:
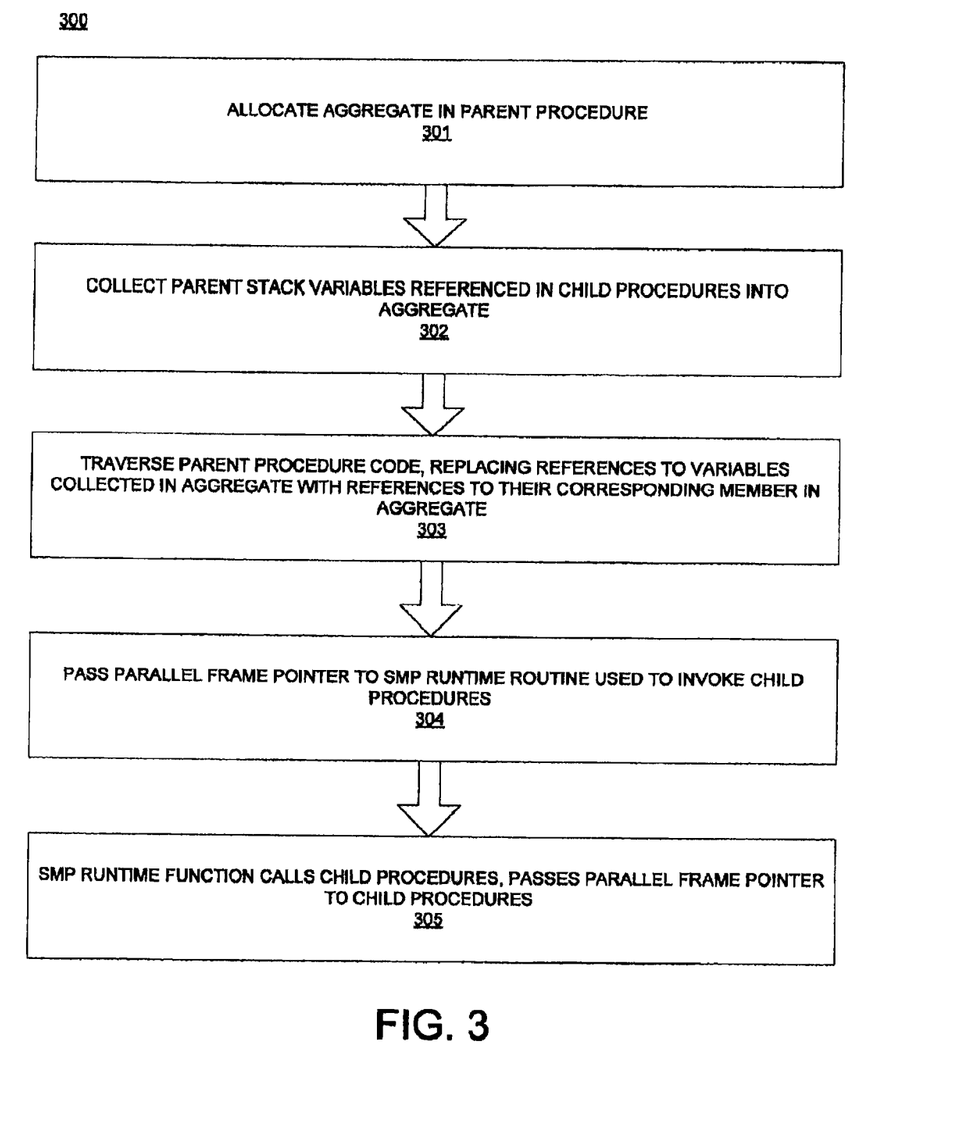
FIG. 3 illustrates an embodiment of a method for updating of a parent procedure.
Figure 4:
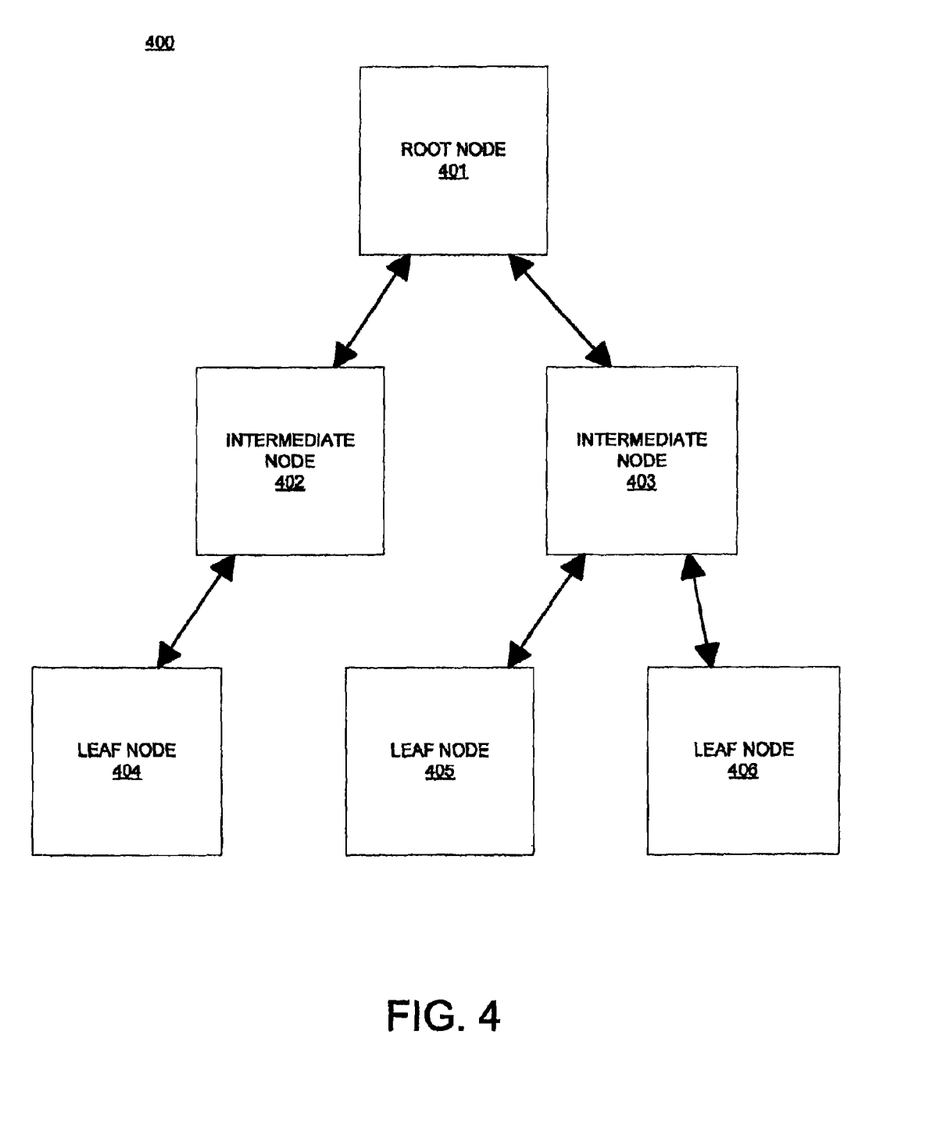
FIG. 4 illustrates an embodiment of a software tree representing hierarchical parent-child relationships between procedures.

FIG. 3 illustrates an embodiment of a method for updating a parent procedure. In block 301, the aggregate data structure is allocated in the parent procedure. The storage for the aggregate data structure may be allocated on the stack of the parent procedure. In block 302, the parent stack variables that are referenced in any child procedure are added to the aggregate, to allow all these variables to be accessed through the parallel frame pointer. The order and general layout of the variables in the aggregate may vary in different embodiments; padding may be introduced where necessary to accommodate any alignment restrictions. In block 303, the computer code that comprises the parent procedure is traversed in lexicographical order, and all references to variables referenced by any child procedure of the parent procedure are replaced with references to the variable's corresponding aggregate data member. In block 304, the parallel frame pointer, which contains the address of the aggregate data structure, is passed to the symmetric multiprocessing (SMP) runtime function used to invoke promoted child procedures during execution. In block 305, the SMP runtime function calls the child procedure, and passes the parallel frame pointer to the child procedure.

Figure 5:
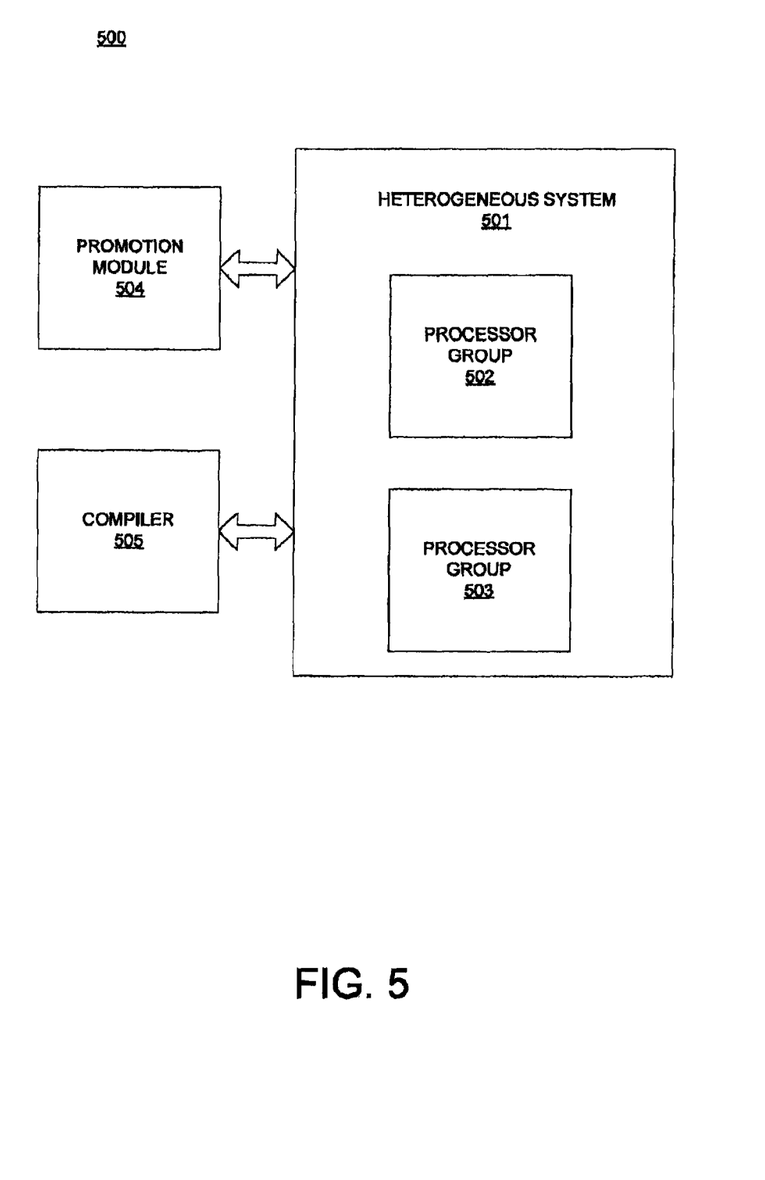
FIG. 5 illustrates a system for promotion of a child procedure in software for a heterogeneous architecture.

FIG. 5 illustrates a system 500 for promotion of a child procedure in heterogeneous architecture software. Heterogeneous computing architecture 501 comprises two different types of processors 502 and 503. Two groups are shown in the embodiment of FIG. 5 for illustrative purposes only; any appropriate number of types of processors may be present in a heterogeneous architecture. There may also be any appropriate number of each type of processor in the heterogeneous architecture. Promotion module 504 promotes any nested procedure in computer code written for heterogeneous architecture 501. Compiler 505 compiles computer code for execution on heterogeneous architecture 501, dividing the computer code into portions for processor groups 502 and 503 and linking the resulting object files together. The compiled code may be executed on the various processors contained in groups 502 and 503 of heterogeneous architecture 501, unconstrained by parent-child relationships.

Figure 6:
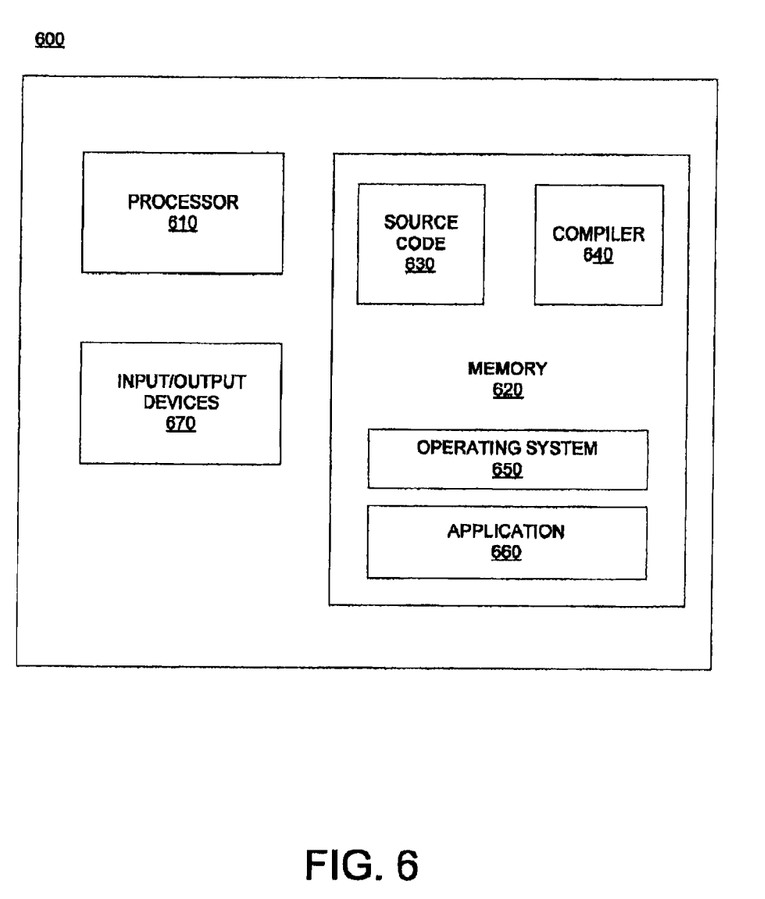
FIG. 6 illustrates a computer that may be used in conjunction with systems and methods for promotion of a child procedure for a heterogeneous architecture.

FIG. 6 illustrates an example of a computer 600 having capabilities, which may be utilized by exemplary embodiments of methods and systems for promotion of a child procedure in software for a heterogeneous architecture as embodied in software. Various operations discussed above may utilize the capabilities of the computer 600. One or more of the capabilities of the computer 600 may be incorporated in any element, module, application, and/or component discussed herein.

The computer 600 includes, but is not limited to, PCs, workstations, laptops, PDAs, palm devices, servers, storages, and the like. Generally, in terms of hardware architecture, the computer 600 may include one or more processors 610, memory 620, and one or more input and/or output (I/O) devices 670 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 610 is a hardware device for executing software that can be stored in the memory 620. The processor 610 can be virtually any custom made or commercially available processor, a central processing unit (CPU), a data signal processor (DSP), or an auxiliary processor among several processors associated with the computer 600, and the processor 610 may be a semiconductor based microprocessor (in the form of a microchip) or a macroprocessor.

The memory 620 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 620 may incorporate electronic, magnetic, optical, and/or other types of storage media. Note that the memory 620 can have a distributed architecture, where various components are situated remote from one another, but can be accessed by the processor 610.

The software in the memory 620 may include one or more separate programs, each of which comprises an ordered listing of executable instructions for implementing logical functions. The software in the memory 620 includes a suitable operating system (OS) 650, compiler 640, source code 630, and one or more applications 660 in accordance with exemplary embodiments. As illustrated, the application 660 comprises numerous functional components for implementing the features and operations of the exemplary embodiments. The application 660 of the computer 600 may represent various applications, computational units, logic, functional units, processes, operations, virtual entities, and/or modules in accordance with exemplary embodiments, but the application 660 is not meant to be a limitation.

The operating system 650 controls the execution of other computer programs, and provides scheduling, input-output control, file and data management, memory management, and communication control and related services. It is contemplated by the inventors that the application 660 for implementing exemplary embodiments may be applicable on all commercially available operating systems.

Application 660 may be a source program, executable program (object code), script, or any other entity comprising a set of instructions to be performed. When a source program, then the program is usually translated via a compiler (such as the compiler 640), assembler, interpreter, or the like, which may or may not be included within the memory 620, so as to operate properly in connection with the OS 650. Furthermore, the application 660 can be written as (a) an object oriented programming language, which has classes of data and methods, or (b) a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices 670 may include input devices such as, for example but not limited to, a mouse, keyboard, scanner, microphone, camera, etc. Furthermore, the I/O devices 670 may also include output devices, for example but not limited to a printer, display, etc. Finally, the I/O devices 670 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 670 also include components for communicating over various networks, such as the Internet or intranet.

If the computer 600 is a PC, workstation, intelligent device or the like, the software in the memory 620 may further include a basic input output system (BIOS) (omitted for simplicity). The BIOS is a set of essential software routines that initialize and test hardware at startup, start the OS 650, and support the transfer of data among the hardware devices. The BIOS is stored in some type of read-only-memory, such as ROM, PROM, EPROM, EEPROM or the like, so that the BIOS can be executed when the computer 600 is activated.

When the computer 600 is in operation, the processor 610 is configured to execute software stored within the memory 620, to communicate data to and from the memory 620, and to generally control operations of the computer 600 pursuant to the software. The application 660 and the OS 650 are read, in whole or in part, by the processor 610, perhaps buffered within the processor 610, and then executed.

When the application 660 is implemented in software it should be noted that the application 660 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 660 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

More specific examples (a nonexhaustive list) of the computer-readable medium may include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 660 is implemented in hardware, the application 660 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The technical effects and benefits of exemplary embodiments include simplification of code separation for a programmer, and maximization of overlay in the heterogeneous system.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method for promotion of a child procedure in a software application for a heterogeneous architecture, wherein the heterogeneous architecture comprises a first architecture type and a second architecture type, the method comprising:
    inserting via a microprocessor a parameter representing a parallel frame pointer to a parent procedure of the child procedure into the child procedure; and
    modifying via the microprocessor a reference in the child procedure to a stack variable of the parent procedure to include an indirect access to the parent procedure via the parallel frame pointer.

2. The method of claim 1, further comprising:
    collecting the stack variable referenced in the child procedure in an aggregate;
    allocating the aggregate in the stack of the parent procedure, and
    modifying a reference to the stack variable in the parent procedure to include a reference to the aggregate.

3. The method of claim 2, further comprising:
    passing the address of the aggregate to a symmetric multiprocessing (SMP) runtime function, and
    passing the parallel frame pointer, the parallel frame pointer comprising the address of the aggregate, to the promoted child procedure via the SMP runtime function.

4. The method of claim 1, further comprising:
    inserting a parameter representing a parallel frame pointer to an ancestor procedure of the child procedure into the child promoted procedure; and modifying a reference in the child procedure to a stack variable of the ancestor procedure to include an indirect access via the parallel frame pointer to the ancestor parent procedure.

5. The method of claim 1, further comprising:
inserting a reference to a parallel frame pointer to an ancestor procedure of the promoted child procedure in an aggregate allocated in the parent procedure; and
modifying a reference in the child procedure to a stack variable of the ancestor procedure to include indirect accesses through the parallel frame pointer to the ancestor parent procedure.

6. The method of claim 1, further comprising:
compiling the parent procedure for the first architecture type; and
compiling the child procedure for the second architecture type.

7. A computer program product comprising a non-transitory computer readable storage medium containing computer code that, when executed by a computer, implements a method for promotion of a child procedure in a software application for a heterogeneous architecture, wherein the heterogeneous architecture comprises a first architecture type and a second architecture type, wherein the method comprises: inserting via a microprocessor of the computer a parameter representing a parallel frame pointer to a parent procedure of the child procedure into the child procedure; and
modifying via the microprocessor a reference in the child procedure to a stack variable of the parent procedure to include an indirect access to the parent procedure via the parallel frame pointer.

8. The computer program product according to claim 7, further comprising:
collecting the stack variable referenced in the child procedure in an aggregate;
collecting the stack variable referenced in the child procedure in an aggregate;
allocating the aggregate in the stack of the parent procedure, and
modifying a reference to the stack variable in the parent procedure to include a reference to the aggregate.

9. The computer program product according to method of claim 8, further comprising:
passing the address of the aggregate to a symmetric multiprocessing (SMP) runtime function, and
passing the parallel frame pointer, the parallel frame pointer comprising the address of the aggregate, to the promoted child procedure via the SMP runtime function.

10. The computer program product according to claim 7, further comprising:
inserting a parameter representing a parallel frame pointer to an ancestor procedure of the child procedure into the child promoted procedure; and
modifying a reference in the child procedure to a stack variable of the ancestor procedure to include an indirect access via the parallel frame pointer to the ancestor parent procedure.

11. The computer program product according to claim 7, further comprising:

inserting a reference to a parallel frame pointer to an ancestor procedure of the promoted child procedure in an aggregate allocated in the parent procedure; and
modifying a reference in the child procedure to a stack variable of the ancestor procedure to include indirect accesses through the parallel frame pointer to the ancestor parent procedure.

12. The computer program product according to claim 7, further comprising:
compiling the parent procedure for the first architecture type; and
compiling the child procedure for the second architecture type.

13. A system for promotion of a child procedure in a software application for a heterogeneous architecture, the system comprising:
a first architecture type;
a second architecture type;
a compiler configured to compile the software application for the first architecture type and the second architecture type; and
a promotion module having a microprocessor, the microprocessor of the promotion module configured to insert a parameter representing a parallel frame pointer to a parent procedure of the child procedure into the child procedure and modify a reference in the child procedure to a stack variable of the parent procedure to include an indirect access to the parent procedure via the parallel frame pointer.

14. The system of claim 13, wherein the promotion module is further configured to collect the stack variable referenced in the child procedure in an aggregate, allocate the aggregate in the stack of the parent procedure, and modify a reference to the stack variable in the parent procedure to include a reference to the aggregate.

15. The system of claim 14, further comprising a symmetric multiprocessing (SMP) runtime function, the SMP runtime function configured to receive a reference to the aggregate.

16. The system of claim 15, wherein the SMP runtime function is further configured to and pass the parallel frame pointer to the promoted child procedure, the parallel frame pointer comprising the address of the aggregate.

17. The system of claim 13, wherein the promotion module is further configured to inserting a parameter representing a parallel frame pointer to an ancestor procedure of the child procedure into the child promoted procedure, and modify a reference in the child procedure to a stack variable of the ancestor procedure to include an indirect access via the parallel frame pointer to the ancestor parent procedure.

18. The system of claim 13, wherein the promotion module is further configured to insert a reference to a parallel frame pointer to an ancestor procedure of the promoted child procedure in an aggregate allocated in the parent procedure; and modify a reference in the child procedure to a stack variable of the ancestor procedure to include indirect accesses through the parallel frame pointer to the ancestor parent procedure.

19. The system of claim 13, wherein the compiler is further configured to compile the parent procedure for the first architecture type and compile the child procedure for the second architecture type.

* * * * *